United States Patent Office 3,099,573
Patented July 30, 1963

3,099,573
AQUEOUS DISPERSION OF PERIODATE OXIDIZED POLYSACCHARIDE-AMINO TRIAZINE REACTION PRODUCT AND PROCESS OF PREPARING SAME
Peter J. Borchert, Elkhart, Ind., assignor to Miles Laboratories, Inc., Elkhart, Ind., a corporation of Indiana
No Drawing. Filed June 22, 1960, Ser. No. 37,830
13 Claims. (Cl. 117—62.2)

This invention relates to derivatives of dialdehyde polysaccharides with amino triazines. In one of its more particular aspects it relates to dispersions of dialdehyde polysaccharide-amino triazine resins.

Dialdehyde polysaccharides, of which dialdehyde starch is an example, may be prepared by the well known oxidation of polysaccharides with periodic acid. This preparation is illustrated by the conversion of starch to dialdehyde starch using periodic acid as the oxidizing agent in accordance with the following equation:

EQUATION 1

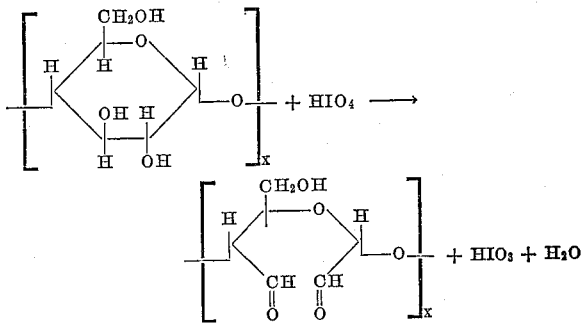

wherein X stands for the number of repeating units in the molecule, which may range from about twenty to several thousand.

As disclosed in my copending application, Serial No. 776,705 filed November 28, 1958, now U.S. Patent 3,021,329, reaction products of dialdehyde polysaccharides with an amino triazine may be prepared in the presence of an acid catalyst. The formation of a mono-amino triazinyl derivative of a dialdehyde polysaccharide can be exemplified by the reaction of dialdehyde starch with melamine as shown in Equation 2.

EQUATION 2

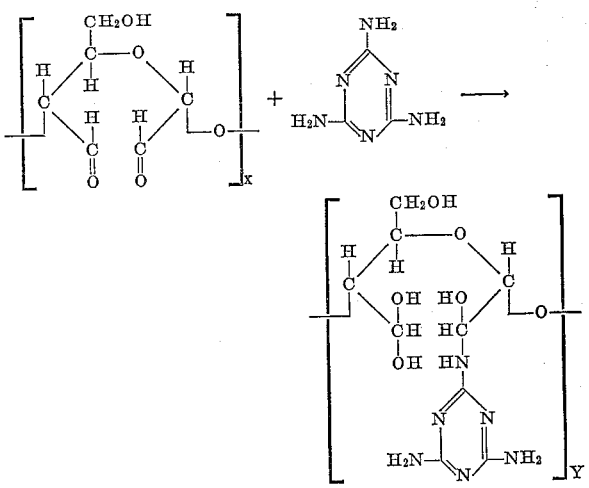

wherein X has the same significance as above and Y represents the number of polymer units which have reacted with melamine. Y may be equal to or less than X.

As pointed out in my copending application the mode of reaction shown is corroborated by various analytical procedures which indicate that the mono-melamine derivative is the predominating product of this reaction.

In my above mentioned copending application these dialdehyde polysaccharide-amino triazine compounds are exemplified specifically as derivatives of dialdehyde starch with melamine or derivatives of melamine such as benzoguanamine and N,N-diallylmelamine. Benzoguanamine has the structure

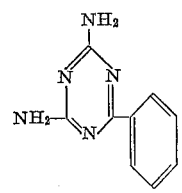

and N,N-diallylmelamine has the structure

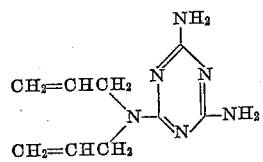

These dialdehyde polysaccharide derivatives are shown to have utility as molding powders in plastics, in the textile industry for yielding crease-proof and crush-proof fabrics, and also in surface coatings, laminating resins, and resins for use in the paper industry. These dialdehyde polysaccharide-amino triazine compounds, however, are recovered as amorphous powders which are water insoluble and insoluble in most organic solvents. For many applications such as in treating paper, it is desirable to have the polymeric treating agent in the form of an easily handled and readily absorbable dispersion such as an aqueous dispersion. The dialdehyde polysaccharide-amino triazine compounds in the form of amorphous powders cannot be readily dispersed in suitable dispersing media and are therefore not adaptable to use in this form.

Melamine-formaldehyde resins, on the other hand, are readily dispersible in a number of dispersing media. Because of this, melamine-formaldehyde resins, particularly in the form of aqueous dispersions, are widely used in the paper, textile, adhesives, and other industries. These resins upon setting, however, are degraded to a certain extent with volatilization of formaldehyde and other volatile compounds. The volatilization of formaldehyde even in small amounts creates hazardous working conditions because of the dangerous fumes which are evolved. In another respect, melamine-formaldehyde resins have the disadvantage of requiring the use of relatively large amounts of melamine in their formation. For instance, most resinous dispersions of melamine-formaldehyde contain a mole proportion of formaldehyde to melamine in the range of from 3:1 to 6:1. In addition, large amounts of acid catalyst are required to prepare colloidal gels from melamine-formaldehyde resins.

Another disadvantage in the use of melamine-formaldehyde resins in the preparation of wet strength paper is that maximum wet strength is achieved only after a storage time of several days.

Some of the disadvantages of the melamine-formaldehyde resins may be overcome by using dispersions of dialdehyde polysaccharide-bisulfite addition products of the type disclosed in U.S. Patent No. 2,880,236 to Charles L. Mehltretter, John W. Van Cleve, and Paul R. Watson. However, these dispersions are relatively unstable under acidic conditions with the evolution of sulfur dioxide occurring at elevated temperatures. Unless conditions are carefully controlled, a complete breakdown in viscosity and the failure of formation of colloid-sized particles will frequently be observed in the use of these resins. Moreover, because particles of dialdehyde polysaccharide-bisulfite addition products are negatively charged, their adherence to cellulose is not sufficiently great to warrant their use in applications where it is desired to coat cellulosic fibers such as papers. In the use of these compounds, as beater additives in paper manufacture, for example, a large amount of aluminum salts must frequently be used to give sufficient attraction of the dialdehyde polysaccharide-bisulfite addition product to the fibers.

Positively charged starch derivatives, known in the trade as cationic starches, have been prepared. These cationic starch derivatives generally comprise starches in which a cationic fraction has been added to the primary hydroxyl group of the starch, for example, by the reaction of starch and a β-dialkylaminoethyl halide in the presence of caustic. However, while these cationic starches exhibit a high attraction to cellulosic fibers by virtue of having a charge opposite to that of cellulose, they have functioned only as fillers, and are thus not effective to produce the kind of stable composition demanded for use in wet strength paper and the like.

It is accordingly a principal object of this invention to provide resinous dispersions which may be used in the paper, textile, and allied industries to greater advantage than the materials currently in use.

Another object of this invention is to provide a partially cationic polysaccharide derivative which can be used in the manufacture of wet strength paper.

A further object of this invention is to provide such cationic polysaccharide derivatives which have groups available for chemical reaction with cellulosic paper fibers.

Yet a further object is to provide wet strength agents having the property of reaching maximum wet strength immediately upon drying.

Another object of this invention is to provide a process for the preparation of such resinous dispersions which is practical and convenient to use.

Another object of this invention is to provide dispersions of nitrogenous resins derived from dialdehyde polysaccharides and amino triazines which have desirable stability characteristics.

Still a further object of this invention is to prepare consistent gels from such resinous dispersions.

This invention in its broadest aspects concerns dispersions of nitrogenous resins comprising the reaction products of dialdehyde polysaccharides with amino triazines. These dispersions may be prepared by reacting a dispersion or solution of either the dialdehyde polysaccharide or amino triazine with the other reactant or alternatively by simultaneously dispersing a dialdehyde polysaccharide and an amino triazine in a suitably prepared aqueous medium. In either case, the reaction takes place at a hydrogen ion concentration of from about pH 5.5 to pH 7.0 and at a temperature of from about 60° C. to 80° C.

The dispersions prepared in accordance with the process of this invention may be put to good advantage in a number of different ways. The dispersions may be used directly, for example, to impart wet strength to paper or in other applications. They may, if desired, be converted to gels for applications where a gel is needed, or may be converted to solid resins for use in the formulation of various coatings.

For carrying out the process of this invention the dialdehyde polysaccharides used as starting materials may be prepared as described above or by the electrolytic procedure disclosed in U.S. Patent No. 2,713,553 to Charles L. Mehltretter, if desired. The dialdehyde polysaccharides to be used in this process may be the dialdehyde derivatives of any polysaccharide such as corn, wheat or potato starches, celluloses, dextrans, algins, inulin, or others. Of these polysaccharides the dialdehyde derivatives of starch, known generically as dialdehyde starch, are the best known and most widely used. However, where it is desired to have derivatives of other polysaccharides, these may also be used.

In general, it is preferred to use dialdehyde polysaccharides which are from about 50% to 100% oxidized, that is, those wherein 50 to 100 of each 100 of the original anhydroglucose units have been converted to dialdehyde units, such as by periodate oxidation.

The amino triazines to be used for preparing the dialdehyde polysaccharide-amino triazine resin dispersions of this invention comprise a class of compounds related to melamine and are characterized in that at least one amino group is available for reaction. They may be exemplified by the formula:

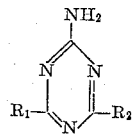

wherein $R_1$ and $R_2$ each independently represent substitutions upon the triazine ring such as alkyl, aryl, halo, amino, and the like. In general, any amino triazine, unsubstituted or substituted, and its salts may be used for preparing the resinous dispersions of this invention. In order for reaction to occur between the dialdehyde polysaccharide and amino triazine a certain level of water solubility must be displayed by the amino triazine used. However, this water solubility may in some cases be minimal. Where the free amine may not have the desired solubility it may be possible to react the amino triazine with the dialdehyde polysaccharide by converting the amino triazine to a salt of the amino triazine having enhanced water solubility. Exemplary of some of the amino triazines which may be used for this purpose are the following in which $R_1$ and $R_2$ represent the radicals shown below:

| $R_1$ | $R_2$ |
|---|---|
| C₆H₅— | NH₂— |
| CH₂=CH—CH₂\N—\nCH₂=CH—CH₂ | NH₂— |
| Cl— | NH₂— |
| CH₃—CH₂—NH— | NH₂— |
| CH₃—CH₂—CH₂—CH₂—NH— | NH₂— |
| C₆H₅—NH— | NH₂— |
| CH₃—CH₂\N—\nCH₃—CH₂ | NH₂— |

| R₁ | R₂ |
|---|---|
| Cl— | CH₃—CH₂—CH₂—CH₂—NH— |
| Cl— | C₆H₅—NH— |
| Cl— | (CH₃—CH₂—CH₂—CH₂)₂N— |
| NC—CH₂—NH— | NC—CH₂—NH— |
| HO—CH₂—CH₂—NH— | HO—CH₂—CH₂—NH₂ |
| HO—CH₂—CH₂—CH₂—NH— | HO—CH₂—CH₂—CH₂—NH— |
| C₆H₅—NH— | C₆H₅—NH— |
| HO—CH₂—CH₂—C₆H₄—NH— | HO—CH₂—CH₂—C₆H₄—NH— |
| C₆H₅—CH₂—NH— | C₆H₅—CH₂—NH— |
| (CH₃CH₂)₂N— | (CH₃CH₂)₂N— |
| (HO—CH₂—CH₂)₂N— | (HO—CH₂—CH₂)₂N— |

One of the procedures for preparing the nitrogenous resin dispersions of this invention which has been found convenient to carry out is that in which an aqueous dispersion of the dialdehyde polysaccharide is first prepared and the amino triazine is thereafter added to the dialdehyde polysaccharide dispersion. The dialdehyde polysaccharide dispersion may be prepared by adding the dialdehyde polysaccharide to water in concentrations up to about 50% by weight. For example, in the case of dialdehyde starch a concentration of from about 10% to 50% by weight is a desirable range. The dialdehyde polysaccharide may be added to water or to a solution buffered at a hydrogen ion concentration in the range of from about pH 5 to pH 8, preferably at about pH 5.5 to pH 7, and at a temperature between about 30° C. and 70° C., preferably at about 50° C. to 60° C. More acidic solutions, that is those having a hydrogen ion concentration of below about pH 5, are not suitable as dispersing media in that little or no dispersion results. More alkaline solutions, that is those of above about pH 8 have the marked disadvantage of degrading the dialdehyde polysaccharide. The addition of dialdehyde polysaccharide is accomplished gradually such as by adding the dialdehyde polysaccharide in portions in order to eliminate any sudden increase in viscosity which may be due to swelling of the granules of the dialdehyde polysaccharide prior to formation of the dispersion. Although the formation of the dialdehyde polysaccharide dispersion may be accomplished at a lower temperature such as room temperature, it has been found preferable to utilize temperatures within the recommended range in order to accelerate the swelling of the granules and thereby facilitate the formation of the dispersion.

For optimum dispersion formation a buffered dispersing medium is used. A buffer serves a dual function as pH control and in facilitating the dispersion of the dialdehyde polysaccharide as well. The concentration of the buffer should be between about 0.1 N to 0.3 N. Any buffer may be used which will give the desired buffering effect within the prescribed pH range of from about pH 5.5 to pH 7. These include disodium phosphate, sodium bicarbonate, and other buffers of a similar nature, as well as water soluble salts of organic acids and organic bases. For example, salts of carboxylic acids such as sodium acetate and salts of sulfonic acids such as sodium p-toluenesulfonate might be used for this purpose. The concentration of the buffer solution and the temperature are inter-related in that the higher the concentration of buffer solution is, the lower the temperature required for forming the dialdehyde polysaccharide dispersion will be.

If the dispersing medium for the dialdehyde polysaccharide is not buffered, that is, if it is desired to use water alone, dispersions of dialdehyde polysaccharides will only be obtained at higher temperatures and with considerably longer heating and then at markedly reduced concentrations. The color of such dispersions indicates that there has been some degradation of the dispersed dialdehyde starch. For example, dispersions having a concentration of only from about 10% to 12% dialdehyde starch are obtained at about 70° to 80° C. even with longer heating. The pH of these dispersions is in the range of from about pH 4.0 to pH 4.5 indicating decomposition.

The corresponding dialdehyde polysaccharide-amino triazine dispersion may be readily formed from the dialdehyde polysaccharide dispersion prepared as described above. This reaction is conducted by adding the amino triazine to the dialdehyde polysaccharide dispersion. The reaction may be accelerated by heating. It is preferred to conduct the reaction at a temperature in the range of from about 60° C. to 80° C. The amino triazine is found to dissolve in the dialdehyde polysaccharide dispersion depending upon its solubility characteristics. The formation of reaction products in which a certain proportion of the polymer units of dialdehyde polysaccharide have been converted to the mono-amino triazinyl addition compound of the dialdehyde is found to occur wherein the proportion of polymer units converted depends upon the proportion of amino triazine used for reaction. Generally, from about 0.1 mole to 0.25 mole of amino triazine is found to give the desired results. Use in a greater proportion than this range generally results in precipitation of some of the reaction product because of cross-linking which occurs in those derivatives wherein more than a small percentage have present the amino triazine moiety.

During the course of the reaction between the dialdehyde polysaccharide and the amino triazine the pH of the reaction medium drops to from pH 5.5 to pH 6.0. Since gelling of the dispersion is found to occur at a hydrogen ion concentration of below about pH 6.0 it is advantageous to stabilize the dispersion upon formation. For purposes of stabilization of the resulting dispersion, it is desirable to adjust the pH to over pH 6, for example, to from about pH 6.0 to pH 6.5. The pH adjustment may be accomplished by use of an appropriate buffer. Although inorganic salt solutions may be used for this purpose, since there may already be present in the reaction medium a certain proportion of metallic ions it is frequently undesirable to add more metallic ions to the dispersion at this point. Accordingly, pH adjustment may be accomplished by the use of organic bases such as alkanolamines of the represented by diethanolamine and triethanolamine. These may be used effectively in a concentration of from about 0.5% to 2% by weight of the solids in the dispersion. For this purpose triethanolamine is particularly preferred. Other organic bases may be used as well to accomplish stabilization of the dispersion by pH adjustment without the introduction of contaminating ions.

Another method of preparing dispersions of the dialdehyde polysaccharide-amino triazine resins of this invention is the method alternatively described above, namely the simultaneous dispersion of the dialdehyde polysaccharide and amino triazine. For this process buffer salts may be used as describe above.

Another method of facilitating the dispersion of the dialdehyde polysaccharide-amino triazine resin or of the dialdehyde polysaccharide itself, if such is desired, is to include with the dialdehyde polysaccharide a certain proportion of a mono-bisulfite addition compound of the dialdehyde polysaccharide, the solubility of which is appreciably greater than the solubility of the dialdehyde polysaccharide itself. Usually from about 20% to 40% by weight of the dialdehyde polysaccharide used is sufficient to accomplish the desired results. Where a mono-bisulfite addition product of a dialdehyde polysaccharide is used dispersions of lighter color are usually obtained. A procedure equivalent to the addition of a mono-bisulfite dialdehyde polysaccharide is the use of from about 5% to 10% by weight of the dialdehyde polysaccharide of sodium bisulfite which results in the formation of some bisulfite addition product. The effect in both cases is similar to that of using buffer salts as explained above. The presence of alkali ions in the dialdehyde polysaccharide-bisulfite addition product, shown here in fragmentary form:

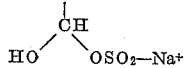

facilitates the formation of the dispersions.

In addition to the two above described procedures for carrying out the process of this invention for the formation of dispersions of dialdehyde polysaccharide-amino triazine resins, a third procedure which may be used is to add the dialdehyde polysaccharide in solid form to an aqueous solution of an amino triazine with stirring. As mentioned above, it is desirable to have present with the amino triazine a buffer salt, a dialdehyde polysaccharide-bisulfite addition compound, or a bisulfite such as sodium bisulfite in order to facilitate the dispersion of the resulting dialdehyde polysaccharide-amino triazine resin.

Although a number of specific methods have been described for carrying out the process of this invention it should be understood that any equivalent process to those herein described is intended to be included within the scope of this invention.

The dialdehyde polysaccharide-amino triazine resin dispersions prepared in accordance with the processes disclosed herein are adaptable to a wide variety of uses. For example, the dispersions may be used as obtained, further concentrated to give more viscous dispersions, dehydrated to form gels or dried, for example, by spray drying to give solid resins.

Dispersions having a solids concentration of upwards of 25% form gels very readily, usually merely upon standing within a period of about two weeks. Some gel formation is observed in the case of resin dispersions having a concentration of greater than about 25% solids even though these dispersions may have been stabilized as by treatment with an alkanolamine as above described. In order to hasten gel formation in those instances where it is desired to have the dispersion in the form of a gel the dispersions resulting from operation of the process of this invention may be concentrated by any conventional technique for concentrating liquids, such as by evaporation under reduced pressure, or evaporation with heating, or merely upon standing. Any other technique may be used for concentrating the dispersions to the desired level of solids content. One advantage of concentrating the dispersions lies in the fact that by so doing a greater quantity of effective dispersion can be stored or shipped in a given volume. Since the highly concentrated dispersions can be readily redispersed to give a dispersion of lower concentration when it is desired to put the dispersion to use as such, the formation of these more highly concentrated dispersions and gels can result in economies in transportation and storage.

A property of the dispersions of this invention which has proved particularly advantageous is the stability of the dispersions upon pH change. In particular, when the pH is changed to an acid pH, for example, to a pH level between about pH 1 and pH 6, instead of forming amorphous polymers from the dialdehyde polysaccharide-amino triazine dispersions, formation of a consistent gel occurs within a few minutes to several months depending upon the concentration of the dispersions, the pH and the temperature. A remarkable characteristic of these gels which probably represent agglomerations of macromolecules is that these gels are still water miscible immediately after they are formed. The formation of water miscible gels is believed to be a kind of reversible association caused by dipole interaction or by the formation of clusters of polymeric salts.

The gels may be readily prepared by simply acidifying the dialdehyde polysaccharide-amino triazine dispersion and either allowing the acidified dispersion to stand at room temperature or heating until a consistent gel is formed, for example, to a temperature of from about 50° C. to 90° C. for a period of from about 1 to 5 minutes. In the case of the gels which are obtained from relatively more highly concentrated dispersions, there is some tendency for the gels to pass the water miscible stage in a very short period and shrink with the release of water upon standing for prolonged periods of time. These gels form polymeric materials which do not appear to be capable of being redispersed like the gels formed from dispersions having lower solids concentrations. The gels prepared from the dialdehyde polysaccharide-amino triazine dispersions of this invention may be used as binders for washable color paints, coatings for washable wall paper, permanent textile fillers, binders for adhesives, and binders in printing inks and pastes.

Another application for the resin dispersions of this invention is in the preparation of water insoluble films. These films may be formed by complete dehydration of the dispersions. Dehydration may be accomplished in a number of ways such as by drying the dispersions at elevated temperatures, for example, by curing at a temperature of from about 60° C. to 90° C. for a period of from about 30 to 60 minutes in the presence of an acidic catalyst, or by using a solvent exchange method to replace the dispersing medium with a solvent wherein the resin may be separated from the dispersion. For the purpose of solvent exchange any water miscible lower aliphatic oxygen-containing compound in which the resin is insoluble including lower alcohols such as methanol, ethanol or isopropanol, or ketones such as acetone may be used. It is believed that the formation of these water insoluble resins may be due to a type of acetalization, with cross-linkages between macromolecules also being of some significance.

Where paper is treated with the resinous dispersions of this invention, in the manufacture of wet strength paper, for example, it is naturally to be expected that some acetalization will occur between the carbonyl groups of the dialdehyde polysaccharide and hydroxyl groups of the cellulose in the paper. This is because in the resulting resins of this invention there are carbonyl groups available for acetalization. This possible acetalization may, of course, occur to a greater extent in the case of dialdehyde polysaccharide-amino triazine dispersions having higher mole ratios of dialdehyde polysaccharide polymer units to amino triazine, for more carbonyl groups are available for reaction in these dispersions. The effect of acetal formation is in fact seen to be more pronounced in the case of these dispersions in the greater tensile strengths demonstrated in papers in which these resin dispersions have been incorporated.

Paper may be treated generally in one of several ways, by tub-sizing, by size press, or by the use of a beater additive. In tub-sizing or the size press process a dispersion of the dialdehyde polysaccharide-amino triazine resin having a solids content of from about 1% to 20% is acidified to a pH of from about pH 4 to pH 6 by the use of any convenient acidic catalyst. Any acid which can be used to adjust the hydrogen ion concentration of the dispersion to the desired value may be used. Acids which are particularly suitable for this purpose include formic acid, acetic acid, propionic acid, lactic acid, citric acid and other organic acids, inorganic acids such as hydrochloric and phosphoric acid or the like, and buffer salts such as salts of aluminum and other salts giving an acid reaction in solution, for example, aluminum sulfate. The use of an acidic catalyst is essential to prepare a paper of maximum wet strength. The next step in the provision of wet strength paper is immersing the paper in the acidified dispersion. This may be accomplished in the size press process by the use of rolls which are immersed in the dispersion and over which the paper passes in the course of the paper manufacturing process. In tub sizing the paper may be simply dipped into the dispersion and the resin dispersion applied in this manner. Other additives than the dialdehyde polysaccharide-amino triazine resin dispersion of this invention may also be applied at this time, for example, various whitening materials such as bleaching agents. For instance, sodium bisulfite may be applied in a concentration in the range of from about 0.1% to 0.5% by weight of the dispersion. Various other additives may be conveniently added at this stage in the paper manufacturing process. Where the solids concentration of the dispersion is relatively high there may be a tendency for the dispersion to gel upon the addition of a acidic catalyst. In such cases it may be desirable to tub-size the paper by immersion in the dispersion which has not been acidified, and then to later acidify the paper which has been treated with the dispersion such as by an acid dip or by spraying with acid. In any event, the acidification of the treated paper is essential in order to insure the production of maximum wet strength paper. The last step in the provision of wet strength paper is the curing of the coated paper. This may be accomplished by heating to a temperature in the range of from about 80° C. to 100° C. and preferably from about 90° C. to 95° C. for a period of 10 minutes to 30 minutes.

An alternative method for utilizing the resin dispersions of this invention in the treatment of paper is as beater additives. In this use the stabilized dispersion is added to the paper pulp and mixed therewith at the wet end of the paper manufacturing process. For example, addition may be made to the beater itself or alternatively to the chest, Jordan discharge line, screen or head box as desired. Before addition of the dispersion its pH is adjusted to a pH in the range of from about pH 4 to pH 5 and it is allowed to stand to build up a colloidal resin dispersion. This build-up is evidenced by the dispersion becoming non-transparent. The process is known as aging. For instance, acetic acid may be added to the dispersion to adjust the hydrogen ion concentration thereof to about pH 4 and the acidified dispersion then allowed to stand at a temperature in the range of from about 40° C. to 50° C. for about 1 hour, after which it is added in a concentration in the range of from about 1% to 5% by weight, preferably about 2% by weight.

Paper which is treated according to any of the processes described not only shows better wet strength characteristics than paper otherwise treated such as without acidification, but is also greatly improved with respect to dry stiffness and permanent dimensional stability. Maximum wet strength is achieved immediately upon drying as above described.

The formation of plastic films is another facet of this invention. Film formation is accomplished by curing a suitably thin coating of the dialdehyde polysaccharide-amino triazine resin dispersion in the presence of an acidic catalyst. For this purpose suitable catalysts include oxalic acid, citric acid, lactic acid, phosphoric acid and other acidic catalysts. Curing is accomplished at elevated temperatures by heating a thin film of the resin dispersion, for example, by heating at a temperature in the range of from about 60° C. to 90° C. for a period of from about 30 minutes to 60 minutes. The resulting dialdehyde polysaccharide-amino triazine resin film is transparent and shows good water resistance. Films formed in this manner are useful in the formulation of various coatings and may be plasticized or treated in any other fashion known in the art, depending upon the use to which these films are to be put.

The invention will be better understood by reference to the following examples which are included for purposes of illustration and are not to be construed as in any way limiting the scope of this invention which is defined in the claims appended hereto.

*Example I*

A solution was prepared by dissolving 10 g. of sodium acetate in 400 ml. of water and heating to 65° C. Under stirring 100 g., 0.48 mole, of dialdehyde starch (90% oxidation, 9.5% moisture) was added in 5 equal portions of 20 g. each over a period of 30 minutes at the same temperature. After the last portion was added and dispersed, the temperature was increased to 69° C. to 70° C. and 61.1 g., 0.048 mole, of melamine was added. The melamine immediately went into solution and the colloidal dispersion became clear. After an additional heating period of 10 minutes at 69–71° C. the dispersion was allowed to cool to room temperature.

It may be seen from this example that the reaction of as little as about 0.1 mole of an amino triazine with a dialdehyde polysaccharide is effective to produce clear dispersions of dialdehyde polysaccharide-amino triazine resins.

The following example illustrates how readily the dispersions of this invention may be converted into gels.

*Example II*

The dispersion prepared according to Example I having a pH of 6–7 was allowed to stand at room temperature for a period of 12 hours. A white gel-like paste resulted. This gel was found to be redispersible in water.

The following example illustrates the preparation of a solid resin from the dispersions of this invention and the Zwitterionic nature of the dialdehyde polysaccharide-amino triazine reaction product.

*Example III*

A quantity of 25 g. of the gel-like paste prepared according to the process of Examples I and II was treated with 100 ml. of methanol. A white precipitate resulted. This precipitate was filtered, washed with methanol and dried in an oven at 60° C.

The ionic charge of this product was determined by slurrying two 50 mg. portions of the dried powder with 20 ml. of 0.1% aqueous solutions of methylene blue and eosin-γ. The resulting slurry was allowed to stand for 10 to 15 minutes with occasional agitation. The dye solutions were then decanted and the dialdehyde starch-melamine resin was washed with acetone several times until the supernatant liquid was essentially colorless. The fact that the dialdehyde starch-melamine resin was stained by both methylene blue, which is a positively charged dye, and eosin-γ, which is a negatively charged dye, showed that the dialdehyde starch-melamine resin contained both anionic and cationic charges.

The following example illustrates the use of the dialdehyde polysaccharide-amino triazine resin dispersions of this invention in the treatment of paper for imparting improved wet strength.

*Example IV*

A dispersion of a dialdehyde starch-melamine resin prepared according to Example I was diluted with water to give a 3% dispersion. Alternatively the gels formed upon standing, according to the procedure of Example II, were redispersed with water by stirring at room temperature. The dilute dispersions were acidified with glacial acetic acid to pH 5 and 0.3% sodium bisulfite based on solid resin was added. Strips of Whatman #1 paper were dipped for 30 seconds in the thus treated dialdehyde starch-melamine dispersion and heat cured at 90° C. to 95° C. for a period of 15 minutes. Strips having a length of 5½ inches (machine direction) and a width of ½ inch were cut and the dry tensile and wet tensile in pounds per inch determined with a Thwing-Albert Tensile Tester, Model 3-7-4P. The wet tensile was based upon both 5 minutes and 30 minutes soaking time. The wet strength was calculated as the ratio of treated dry tensile to wet tensile X 100. The resulting data are shown in Table 1 below, wherein paper treated as above described is compared with untreated paper, with paper treated with a dispersion of dialdehyde starch, and with paper treated with a dispersion of a dialdehyde starch-bisulfite addition product having a molar ratio of dialdehyde starch to bisulfite of 1:1.

TABLE 1

| | Uptake of size (percent) | Dry tensile (lb./in.) | Wet tensile [1] (lb./in.) soaking time | | Wet strength [2] (percent), soaking time | |
|---|---|---|---|---|---|---|
| | | | 5 min. | 30 min. | 5 min. | 30 min. |
| Untreated paper | | 6.4 | 0 | | | |
| Dialdehyde starch - melamine dispersion | 4.0 | 12.60 | 5.20 | 4.37 | 41.3 | 34.8 |
| Dialdehyde starch dispersion | 6.4 | 7.94 | 2.11 | 1.61 | 26.5 | 20.2 |
| Dialdehyde starch - bisulfite dispersion | 9.3 | 7.28 | 1.00 | 0.74 | 13.7 | 10.2 |

[1] Actual readings on Thwing-Albert Tester, Model 3-7-4P.
[2] $\frac{\text{Wet Tensile}}{\text{Dry Tensile}} \times 100$ These data clearly show that paper treated with the dialdehyde polysaccharide-amino triazine resin dispersions of this invention displays strikingly improved wet strength characteristics over either untreated paper or paper treated with dialdehyde polysaccharide dispersions not having amino triazine moieties present or even the bisulfite addition compounds of dialdehyde starch.

The following example illustrates the preparation of dialdehyde polysaccharide-amino triazine resin dispersions wherein the dialdehyde polysaccharide and amino triazine are present in a ratio of 1:0.25 compared to the dialdehyde polysaccharide to amino triazine ratio of 1:0.1 in the case of Example I.

*Example V*

The procedure of Example I was followed except that 15 g., 0.118 mole, of melamine was used. A similar dispersion was formed which gelled upon standing at room temperature for a period of 12 hours.

The following example illustrates the stabilization of the dialdehyde polysaccharide-amino triazine resin dispersions of this invention by the use of an organic base to adjust the hydrogen ion concentration of the dispersion to pH 6.0 to pH 6.5.

*Example VI*

A dry blended mixture of 350 g., 1.98 moles, of dialdehyde starch (94.4% oxidation, 7.8% moisture) with 70 g., 0.38 mole, dialdehyde starch-monobisulfite and 25.2 g., 0.198 mole, of melamine was divided into portions of 75 g. and added with stirring to 2800 g. of water which was heated at 74° C. The addition of all the dry blended mix was accomplished in a period of 10 minutes dispersing each portion as added. The resulting mixture was allowed to cool over a period of 30 minutes to 60° C. A viscous dispersion resulted. To this dispersion was added 3.5 g. of triethanolamine, upon which the viscosity immediately decreased. The dispersion was then cooled to room temperature. It had a pH of 6.6 and a viscosity of 13 cps., and was stable over a period of two months.

The above shows that stable dialdehyde polysaccharide-amino triazine resin dispersions may be prepared according to the process of this invention by using an organic base such as triethanolamine to prevent agglomeration and formation of non-water redispersible gels. This example also shows that a dialdehyde polysaccharide-monobisulfite addition compound can be used to facilitate formation of the dispersion.

The following example illustrates the preparation of a stable dispersion of a dialdehyde polysaccharide-amino triazine resin using diallylmelamine as the amino triazine. This compound is one of a class of substituted melamines which may be used in preparing the products of this invention.

*Example VII*

To 400 g. of water heated at 70° C. was added under stirring a dry blend consisting of 50 g., 0.27 mole, of dialdehyde starch (94.4% oxidation, 7.8% moisture), 5.5 g., 0.027 mole, of diallylmelamine and 5 g. of sodium bisulfite. The addition was accomplished in parts over a period of 10 minutes. The resulting nearly clear liquid was cooled to room temperature and found to have a hydrogen ion concentration of pH 6.0. In order to stabilize the dispersion the hydrogen ion concentration was adjusted to pH 6.3 by using 0.2 g. of triethanolamine. The resulting dispersion was clear and stable over an extended period of time.

The following example illustrates the preparation of a dialdehyde polysaccharide-amino triazine resin dispersion in which the amino triazine used was benzoguanamine, another type of amino triazine which has been found useful for preparing the nitrogenous resin dispersions of this invention.

*Example VIII*

A dry blend of 50 g., 0.27 mole, of dialdehyde starch (94.4% oxidation, 7.8% moisture), 5.1 g., 0.027 mole, of benzoguanamine and 5 g. of sodium bisulfite was added in parts over a period of 10 minutes to 400 g. of water heated at 70° C. The mixture was stirred continuously during the additions. The resulting slightly cloudy liquid dispersion was cooled to room temperature and found to have a hydrogen ion concentration of pH 6.0. In order to stabilize the dispersion the hydrogen ion concentration was adjusted to pH 6.4 with 0.2 g. of triethanolamine. The resulting dispersion was slightly cloudy and stable over an extended period of time.

The foregoing example shows that even difficultly soluble amino triazines, such as benzoguanamine, which is soluble in water only to the extent of about 0.06% at 22° C., may be used in preparing the dialdehyde polysaccharide-amino triazine resin dispersion of this invention.

In summary, dispersions of dialdehyde polysaccharide-amino triazine resins which are versatile in application are prepared by reacting a dialdehyde polysaccharide and an amino triazine, one of which is used as a dispersion or solution. For best results, the liquid phase is buffered at a hydrogen ion concentration in the range of from about pH 5.5 to pH 7.0. The resulting resin dispersions are of a Zwitterionic character. They may be stabilized by adjusting the hydrogen ion concentration to from about pH 6.0 to pH 6.5. These dispersions may be used as such, formed into gels, dehydrated to give solid resins, or used in film formation. One of the outstanding uses of the dialdehyde polysaccharide-amino triazine resin dispersions lies in their ability to impart greatly improved characteristics, such as wet strength and dimensional stability to paper.

What is claimed is:

1. An aqueous dispersion of a reaction product of a periodate oxidized polysaccharide with an amino triazine prepared by mixing a periodate oxidized polysaccharide with an amino triazine in an aqueous dispersion medium therefor at a hydrogen ion concentration in the range of from about pH 5.5 to pH 7.0 and a temperature of from about 60° C. to 80° C. until complete dispersion of the reaction product thereof.

2. A product according to claim 1 wherein the amino triazine is melamine.

3. A process for preparing an aqueous dispersion of a reaction product of a periodate oxidized polysaccharide with an amino triazine which comprises mixing a periodate oxidized polysaccharide with an amino triazine in an aqueous dispersion medium therefor at a hydrogen ion concentration in the range of from about pH 5.5 to pH 7.0 and at a temperature of from about 60° C. to 80° C. until complete dispersion of the reaction product thereof.

4. A process for preparing a stable aqueous dispersion of a reaction product of a periodate oxidized polysaccharide with an amino triazine which comprises mixing a periodate oxidized polysaccharide with an amino triazine in an aqueous dispersion medium therefor at a hydrogen ion concentration in the range of from about pH 5.5 to pH 7 and at a temperature of from about 60° C. to 80° C. until complete dispersion of the reaction product thereof, and thereafter stabilizing said dispersion by adjusting the hydrogen ion concentration to from about pH 6.0 to pH 6.5.

5. A process for preparing consistent gels of periodate oxidized polysaccharide-amino triazine resin dispersions which comprises acidifying a periodate oxidized polysaccharide-amino triazine resin dispersion to a hydrogen ion concentration in the range of from about pH 1 to pH 6.

6. A process according to claim 5 wherein after acidification said dispersion is allowed to stand at room temperature for from about 1 to 12 hours.

7. A consistent gel of a periodate oxidized polysaccharide-amino triazine resin dispersion prepared according to the process of claim 5.

8. A process for the preparation of a water insoluble film of a nitrogenous resin which comprises reacting a periodate oxidized polysaccharide with an amino triazine in a ratio of from about 0.1 mole to about 0.25 mole of amino triazine per polymer unit of periodate oxidized polysaccharide in an aqueous dispersion medium therefor at a hydrogen ion concentration of from about pH 5.5 to pH 7.0 and a temperature of from about 60° C. to 80° C. whereby an aqueous dispersion of the reaction product thereof results and thereafter dehydrating said resulting aqueous dispersion to form a stable water insoluble nitrogenous resin film.

9. A water insoluble film of a periodate oxidized polysaccharide-amino triazine resin prepared according to the process of claim 8.

10. A process for imparting enhanced wet strength characteristics to paper which comprises treating paper with about a 1% to 20% solids containing dispersion of a periodate oxidized polysaccharide-amino triazine resin prepared according to the process of claim 3, said periodate oxidized polysaccharide-amino triazine resin dispersion having been acidified to a hydrogen ion concentration in the range of from about pH 4 to pH 6, and curing said treated paper at a temperature in the range of from about 80° C. to 100° C. for a period of from about 10 to 30 minutes.

11. A paper which has been treated according to the process of claim 10.

12. A process for imparting enhanced wet strength characteristics to paper which comprises treating paper with about a 1% to 20% solids containing dispersion of a periodate oxidized polysaccharide-amino triazine resin prepared according to the process of claim 3, acidifying with an aqueous solution of an acidic catalyst and curing at a temperature in the range of from about 80° C to 100° C. for a period of from about 10 to 30 minutes.

13. A paper which has been treated according to the process of claim 12.

References Cited in the file of this patent

UNITED STATES PATENTS

| | | |
|---|---|---|
| 2,688,607 | Suen | Sept. 7, 1954 |
| 2,880,236 | Mehltretter et al. | Mar. 31, 1959 |
| 2,915,502 | Albrecht | Dec. 1, 1959 |

OTHER REFERENCES

Sloan et al.: "Properties of Periodate Oxidized Starch," Ind. and Eng. Chem., volume 48, 1956, pages 1165–1172.